F. T. HAGUE.
WINDING FOR DYNAMO ELECTRIC MACHINES.
APPLICATION FILED SEPT. 15, 1916.

1,395,409.

Patented Nov. 1, 1921.
4 SHEETS—SHEET 4.

WITNESSES:
R. J. Ridge
D. C. Davis

INVENTOR
Floyd T. Hague
BY
Wesley G. Carr
ATTORNEY

UNITED STATES PATENT OFFICE.

FLOYD T. HAGUE, OF PITTSBURGH, PENNSYLVANIA, ASSIGNOR TO WESTINGHOUSE ELECTRIC AND MANUFACTURING COMPANY, A CORPORATION OF PENNSYLVANIA.

WINDING FOR DYNAMO-ELECTRIC MACHINES.

1,395,409.  Specification of Letters Patent.  Patented Nov. 1, 1921.

Application filed September 15, 1916. Serial No. 120,266.

*To all whom it may concern:*

Be it known that I, FLOYD T. HAGUE, a citizen of the United States, and a resident of Pittsburgh, in the county of Allegheny and State of Pennsylvania, have invented a new and useful Improvement in Windings for Dynamo-Electric Machines, of which the following is a specification.

My invention relates to dynamo-electric machinery of the commutator type, adapted particularly for large-capacity, high-speed operation or for the production of very large currents, and it has for its object to provide means whereby, in apparatus of the character designated, the generated voltage per commutator bar and also the reactance voltage per commutator bar at the brushes may be greatly reduced with respect to present standard practice, thus rendering possible the manufacture of machines of small dimensions and of desirable commutating characteristics for a given capacity.

In the accompanying drawings.

In the operation of a dynamo-electric machine of the commutator type, the reactance voltage tends to produce a spark when a brush breaks contact with a commutator segment. Said voltage is generated in the short-circuited coil by the collapse of the magnetic field interlinking therewith. The reactance voltage varies directly with the number of commutator bars used, so that a decrease in the number of bars used tends to decrease it.

A second source of electromotive force operating to produce a spark between adjacent commutator bars (when they are out from under the brushes and between brush arms) and a consequent tendency to flash over between brush arms, is the maximum generated voltage between adjacent commutator bars which is obviously a function of the total generated voltage of the machine divided by the number of active commutator segments and is further accentuated by field distortion under load.

The reactance voltage and the generated voltage per bar are so related that, for a given speed, number of poles and voltage, the former decreases with the number of bars, whereas the latter increases with a decrease in the number of bars.

In order to design a commercially operable machine, therefore, it is necessary to give due consideration to each of these divergance factors, the effort being to have the resultant design, in every case, represent the most effective compromise possible under the specific operating conditions involved.

It is possible to effect satisfactory compromises of these factors in the usual machine, but, in the design of high-speed large-capacity machines, difficulties arise in evolving a satisfactory solution. High speed with commercial voltages demands few armature turns and, consequently, few commutator bars. This produces too high a maximum generated voltage per bar, leading to flash-overs. To increase the number of bars sufficiently to eliminate flash-overs, so shortens the time for current reversal in each armature coil as to increase the reactance voltage to a prohibitive amount.

The determination of the permissible magnitude of the reactance voltage involves two factors, viz., (1) the reactance voltage per bar and (2) the reactance volts per brush or the volts per bar multiplied by the bars covered by a brush.

Although experience has shown that five volts per bar for the reactance voltage is substantially the limit for safe operation, the volts per brush has no general limit but must be determined in conjunction with the reactance volts per bar. Apparently, a decrease in the volts per bar permits an increase in the volts per brush and vice versa. This, in conjunction with other facts, leads to the conclusion that the commutating ability of a brush surface is influenced by the total watt loss thereacross.

It has been proved mathematically that, for a given reactance voltage per brush, the watt loss due to the reactance voltage depends on the number of bars spanned by the brush, the relation being substantially as follows:

| Bars covered. | Watt loss. |
|---|---|
| 1 | 100% |
| 2 | 63% |
| 3 | 58% |
| 4 | 56% |

From this it follows that two or more bars should always be spanned by a brush to obtain reasonable commutating performance.

By my invention, I provide means whereby the aforementioned limits of design may be widely extended, still providing machines which operate satisfactorily.

Briefly speaking, my invention comprises providing the armature of a dynamo-electric machine with two or more distinct armature windings, each of said windings being uniformly distributed over the armature surface and said windings being sandwiched with each other and connected in rotation to successive commutator segments, the coils of the different windings being so disposed and proportioned that any commutator segment connected to a certain winding is at all times intermediate in potential, with reference to the zero potential of both windings, between its neighboring segments which are connected to another winding or windings. The maintenance of said voltage relation necessitates the use of permanent connections between equi-potential points in the different windings, in addition to the usual equalizing means associated with each winding. Each winding has a particular coil throw, such that, as regards the generation of voltage and the carrying of current, they are truly in parallel; but, as regards the relative potential between the adjacent bars, it is the same as though all bars belong to a single series winding. I thus obtain the effect of a total number of bars that is double the number of active bars, since the total number of bars is effective in reducing the volts per bar. The reactance voltage is proportional to the number of bars in one winding only and the current in that winding. In other words, the reactance voltage per bar, of any machine, may be reduced 50% by using this type of winding and still use the same number of "active commutator bars" as before. The operation of said windings in parallel with each other, each winding having preferably fewer turns than an ordinary winding, permits the production of extremely large currents, of low voltage, as desired for electrolytic work, or the production of ordinary commercial voltages, when operating at very high speed, as is desirable when employing a steam turbine as the prime mover. Thus, a direct-current machine or a rotary converter may be built to run at a higher speed or a higher K. W. output at the same speed, without any increase in its reactance voltage per bar, or the reactance voltage per bar of any machine may be decreased 50%, using the same number of active bars as before.

The above considerations apply to all commutator-type machines, whether alternating-current or direct-current machines.

By means of my invention an even progression of the phases of the voltages in the several coils is obtained without increasing the number of slots. This result is obtained by forming one coil in each slot of one winding of a width or throw differing by one slot from the width of the coils of the other winding, so that two coils of different windings, which, on one side, lie together in the same slot and, on the other side, are separated by a space equal to the distance between adjacent slots; that is, the center lines of the coils are displaced from each other by half the distance between adjacent slots, which is equivalent to shifting the coils relatively to each other by an amount equal to one-half the distance between slots. Consequently, my arrangement gives exactly the desired progression of phases of the induced voltages, in the several coils of both windings, which is desired to secure satisfactory commutation.

Another distinctive feature of my invention is the use of the equi-potential connections between the different windings, said connections being essential to maintain a proper uniform potential distribution between adjacent members under all conditions, as will hereinafter more fully appear.

Any machine which is provided with a compensating winding solely to enable it to have a less number of commutator bars to improve commutation may omit the compensating winding and use this winding and thus obtain comparable results, in this one respect, or if used in conjunction with a compensating winding, still better results may be obtained.

It has been proposed heretofore to employ a plurality of parallel armature windings connected to alternate segments of the commutator and to employ commutator brushes of a width insufficient to bridge two commutator segments that are connected to the same winding. By this means, all short-circuiting of the armature coils during commutation is avoided. This arrangement, in effect, actually open-circuits one of the two parallel windings every time it moves a bar pitch and, as such, is not commercially operative. Furthermore, from the standpoint of voltage distribution around the commutator, the arrangements of the parallel windings which have been employed heretofore present certain disadvantages. Suppose, for example, that it is desired to employ two parallel armature windings instead of a single winding, each winding to be connected to alternate commutator segments. Obviously, if the induced armature-voltage at the successive commutator segments is to progress regularly in phase, as is the case with the commutator segments of an armature having a single distributed winding, the phase of the induced voltages in the several armature coils of both windings must progress regularly in accordance with the order in which these coils are connected to the commutator segments; that is, since each coil of one winding is connected to a segment between two segments to which adjacent coils of the second winding are connected, the induced voltage in each coil of the first winding should be midway in phase between the voltages induced in the adjacent coils of the second winding. In other words, each coil of the first winding should be placed on the armature midway between the positions of the two adjacent coils of the second winding. Since the construction ordinarily employed in dynamo-electric machines involves a laminated slotted armature core, it would be necessary to double the number of slots which would be employed for a single winding, in order that the coils of the second winding might be disposed half way between the adjacent coils of the first winding. Doubling the number of slots, however, is usually out of the question, since it would involve an excessive number of slots and would too greatly reduce the size of the teeth between slots. Consequently, the arrangement that has ordinarily been employed heretofore is to place the coils of the two windings in the same slots. With this arrangement, the phase of the voltage of two coils connected to two adjacent commutator segments is exactly the same, while, between each of those segments and the one beyond, there is a difference in phase of the voltages of twice the amount which would be present if the coils of both windings were distributed in uniform progression.

Figures 4, 5:
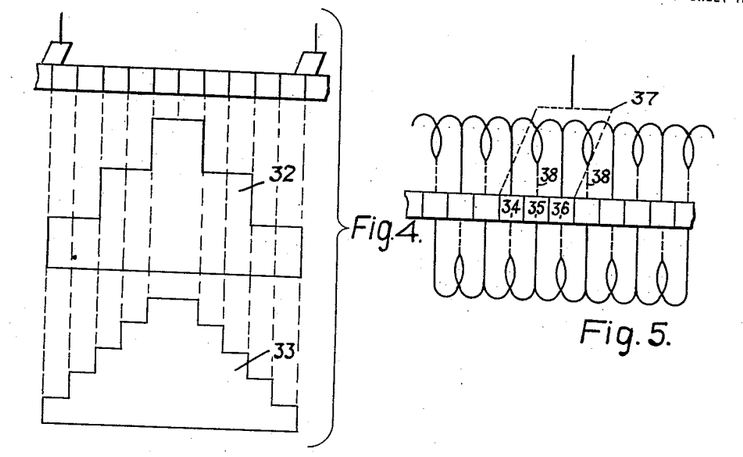
Figs. 4 and 5 are detail views illustrating certain phases of the commutating operation in a machine embodying my invention.

Referring to Fig. 4, the distribution of potential around the commutator, in a winding of the old type, is indicated at 32. The potential remains substantially constant across two bars and then radically increases, maintaining a substantially constant value across the next two bars. The effect of two windings, distributed and provided with equi-potential inter-connections, in accordance with my invention, is to break up the voltage distribution curve into a large number of small steps, as indicated at 33 in Fig. 4, with consequent greatly improved commutation.

It has been proposed to provide an armature with two distinct intermeshed windings, each of said windings being connected to alternate commutator segments, and to further provide said windings with equi-potential leads, said leads obviously leading from the front end of a coil of one winding to the back end of an adjacent coil of the other winding, in order to obtain connecting points of like phase. The average potential of these points of connection is the same but, with this type of construction, it is impossible to obtain two points which are at exactly the same potential at all instants because of the fact that all of the coils are of the same pitch and it is necessary, therefore, that coils of the two windings enter or emerge from the field of a given pole piece in alternation. There is thus a temporary unbalancing of the electromotive forces in the parallel current paths provided by the two windings between any two connection points in the above-described winding and a resultant circulation of harmful currents which materialy lessens the efficiency of the machine. The instantaneous E. M. F. tending to produce said circulating currents may attain a value of 4% of the total E. M. F. of the machine, this unbalanced E. M. F. being amply sufficient to circulate currents of large magnitude through the extremely low-resistance path evolved.

It has further been proposed to apply two distinct distributed windings to the armature of a dynamo-electric machine, said windings being sandwiched with each other and connected to alternate commutator segments, respectively. The two windings in question are made up of coils of different pitch, whereby, under favorable operating conditions, the potential of all the commutator segments follows a uniform gradation from one brush around to its neighbor. No equi-potential connections have been employed, however, in connection with said structure, and said desired potential relation between the commutator segments is, therefore, not actual but merely relative because there is no actual electrical connection between the two windings. That is to say, if it is disturbed by any cause, whatsoever, such, for example, as the bridging of two commutator segments by particles of copper dust or other conducting material, there is no definite restoring force tending to force the different commutator segments to assume and maintain the desired potential relation with respect to each other.

By my invention, I apply equi-potential leads between the two windings in apparatus of the character last mentioned above and I thus provide means whereby the potential distribution between adjacent commutator bars, which are present in said structure only under the best operating conditions, are present in my machine, under all conditions. Furthermore, by the use of said equi-potential windings, the reactance voltage between adjacent bars involved in the commutating phenomenon is reduced to one-half the value that is encountered in said structure with a given machine, as will hereinafter more fully appear.

My employing a composite winding of this character, where in the component windings are of different pitch and wherein equi-potential points in the two windings between which the sum of the instantaneous electromotive forces are, at all times, equal, are connected together by equi-potential leads, there is never developed an unbalanced electromotive force tending to produce harmful circulating currents. The parallel conductors of the two windings connected in a certain possible circulating path enter and emerge from the magnetic field of a certain pole piece in pairs because of the different coil throws of the two windings, the exact law for which will be specifically stated later.

The action of equi-potential connections in maintaining the relative polarity of the two windings is dependent, to some extent, on the number of connections made. If two connections per pair of poles are made, we have a single-phase restoring force; for three connections we have a three-phase force (which is the smallest number required to give a constant force) and for $n$ connections an $n$ phase force.

Figure 1:
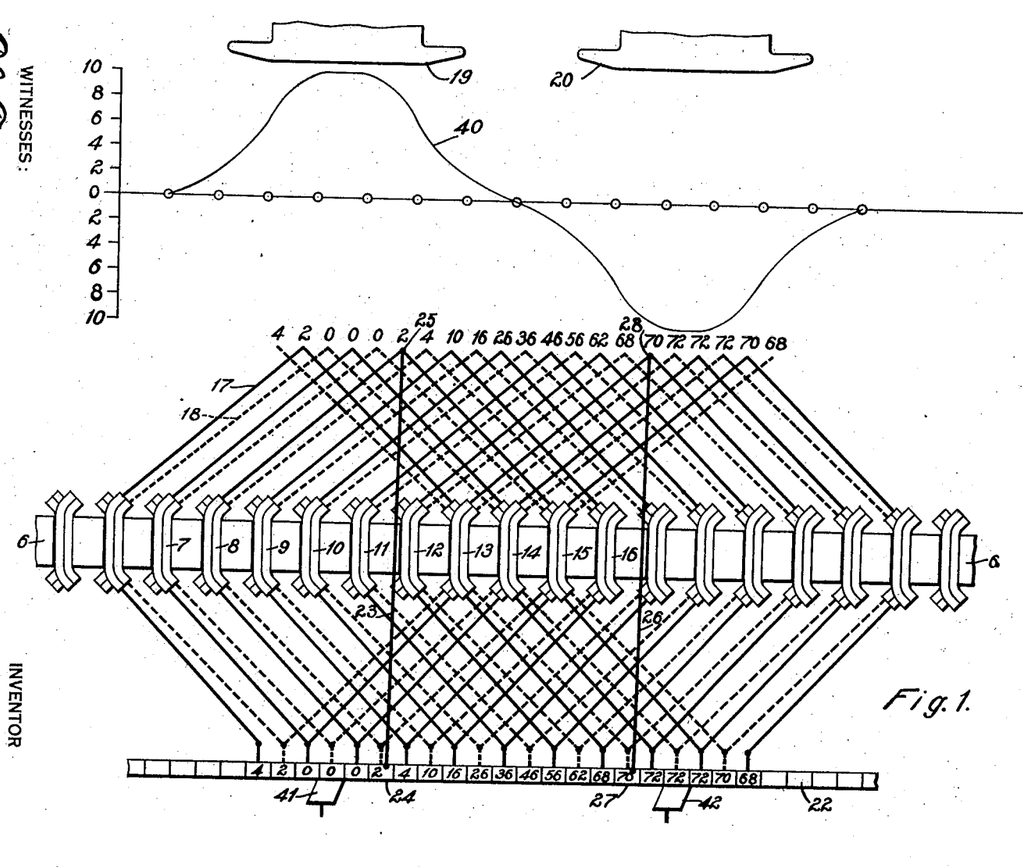
Figure 1 is a developed diagrammatic view of an armature winding, together with its associated commutator connections, illustrating my invention as applied to a large-current, low-voltage machine.

Referring to Fig. 1 for a more detailed understanding of my invention, I indicate the face of the armature core of a dynamoelectric machine at 6, said core being provided with suitable slots, certain of which are numbered 7 to 16, inclusive. Two windings 17 and 18, of the progressive, lap type, are applied to the core member 6, the winding 17 having a forward pitch of seven slots and a backward pitch of six slots and the winding 18 having a forward pitch of eight slots and a backward pitch of seven slots. The pole pitch of the machine is substantially seven slots, as indicated by the pole pieces 19 and 20, and the winding 17 is therefore pitch-wound, whereas the winding 18 is given a long chord of one slot. A commutator 22, of usual construction, is associated with the core member 6 and alternate segments thereof are connected to the windings 17 and 18, respectively. A line 40, plotted under the pole pieces, indicates, by its position, the distribution and magnitude of the field flux produced by the field poles 19 and 20. It will be noted that the field distribution is such that an armature conductor occupying the instantaneous position of the slot 7 has no electromotive force generated therein; that, in the slot 8, two volts are generated in each conductor, in the slot 9, six volts, etc. Starting from the left hand brush 41 and integrating the voltages generated in the two windings 17 and 18 to successive commutator bars, the results are as indicated in the numerals placed upon the bars, that is to say, the voltage around the commutator builds up from the brush 41 according to the sequence 0, 2, 4, 10, 16, 26 — — —to a maximum of 72 under the brush 42, thence decreasing by a similar sequence to the next brush of the polarity of the brush 41.

If, in like manner, the voltages between the brush 41 and successive back ends of the armature coils are integrated, the resultant voltage distribution is as indicated by the numerals there located, and it will be noted that the voltage builds up in exactly the same sequence as the voltage around the commutator.

Furthermore, the arrangement is such that any point, as 24, in the commutator which is of the same potential as a point 25 in the back of the armature winding, will remain at the same potential as said point 25 throughout a revolution of the armature. Thus, said points 24 and 25 may be joined by an equi-potential lead 23. Sections of each armature winding are thus connected together in parallel relation by said equi-potential leads and it will be observed, not only that there are like numbers of active armature conductors in each of said parallel paths, but also that armature conductors from each of said paths enter together and emerge together from the field of any given pole piece, thus insuring that, at no time, is there an unbalanced electromotive force producing and circulating current through the closed circuit produced by said two parallel paths.

The absence of these equi-potential leads between the two windings, as in the prior art, prevents the reduction of the reactance voltage between adjacent commutator bars, or any improvement of commutation for the following reason. Referring to Fig. 5, consideration will be given to three consecutive commutator bars 34, 35 and 36; 34 and 36 being connected to one winding and 35 being connected to the other winding. Assume a reactance or self-inductive voltage of 5 volts produced in a coil connected between segments 34 and 36. If a brush 37 breaks contact with the segment 34, the full self-inductive voltage of 5 volts is acting between the brush and bar 34 to cause an arc on the basis of there being no equi-potential connections. The presence of the bar 35 has absolutely no influence in the reduction of voltage because it is not electrically connected to the bars 34 and 36.

Considering the effect of equi-potential connections, as shown diagrammatically by dotted lines 38; when the contact of the brush 37 and bar 34 is broken, the voltage causing an arc is reduced to one-half of the previous value or to 2½ volts because only one-half of the coil circuit is open circuited by the brush movement at one time. It should be noted that the full number of equi-potential connections is not essential to obtain this reduction of reactance voltage between adjacent bars. Only a sufficient number of low-resistance connections is required to establish a definite voltage relation between the two windings, three per pair of poles being the minimum allowable for satisfactory operation.

Figure 2:
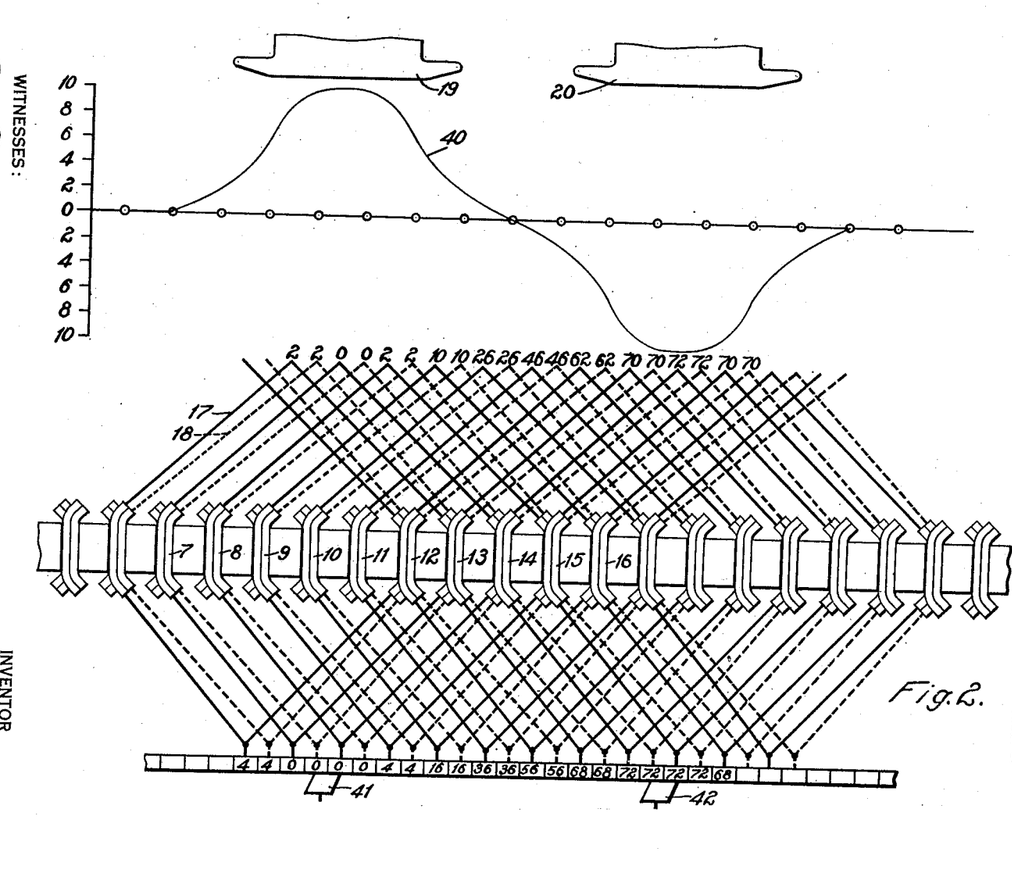
Fig. 2 is a view similar to Fig. 1 and illustrating a winding of the prior art.

The winding shown in Fig. 2 is of the first type above described, said winding being made up of two component sandwiched windings of like pitch and provided with so-called equi-potential leads.

Applying the same system of notation employed in connection with Fig. 1, it is seen that the voltage around the commutator builds up in accordance with the sequence 0, 4, 4, 16, 16, 36 — — —, whereas, the voltage of the back ends of the armature coils builds up in accordance with the different sequence 0, 2, 2, 10, 10, 26, 26, 46, — — — — — —. Thus, no points are found that are, at all times, of equal potential and, therefore, are suitable for the application of equi-potential leads, as is true in the system of Fig. 1.

Figure 3:
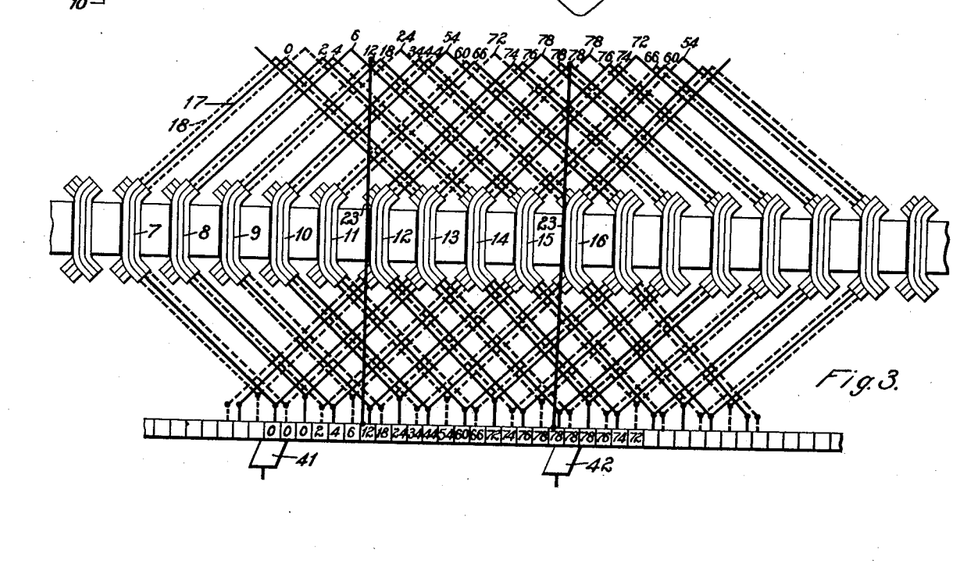
Fig. 3 is a view similar to Fig. 1 and illustrating a winding constructed in accordance with my invention having a greater number of conductors per slot than the windings previously illustrated.

It is frequently desirable that more than four conductors be placed in each armature slot, and under these conditions, I may arrange the windings as shown in Fig. 3, which illustrates a six-conductor-per-slot combination. Two progressive windings 17 and 18 are employed, as before, and each winding is composed of two pitch-wound coils succeeded by one coil having a long chord of one slot, or, in other words, two of the coils lying in the top of any given slot are pitch-wound and one is long chorded and a like relation holds true of the three conductor turns lying in the bottom of any given slot. Suitable equi-potential connections are shown at 23—23.

The winding of Fig. 3 suggests the possibility of employing still other numbers of conductors per slot, and the general rules to be applied in determining whether a proposed winding arrangement will be operative in accordance with my invention are as follows:

The requisite conditions to obtain the full number of equi-potential points in both windings are (1) in every slot, all of the windings except one must have a pitch throw and (2) the other winding must have a long chord of one bar, if a progressive winding is used, or a short chord of one bar if a retrogressive winding is used. This means that, for two bars per slot, half numbers of slots per pole may not be used if the maximum number of equi-potential connections are desired and this limits the possible chording combinations to an average chording of one-half slot.

The two-bar per slot combination is a special case which permits other coil throws to be used than that outlined in the above rule, provided that less than the full number of equi-potential connections is used. Any coil throw may be used regardless of whether or not the slots per pole are integral provided that (1) only one equi-potential connection is made per slot, (2) that the equi-potential connections, whenever made, shall always be attached to the same relative conductors in each slot, and (3) that, in each slot between equi-potential connections, there shall be the same number of parallel conductors of each winding. This is the essential condition to obtain equi-potential points.

This makes it possible to obtain a chording of 1½ slots, when using an integral number of slots per pole, or makes it possible to obtain one slot chording, when using half numbers of slots per pole. These same statements are true for two, four and six, etc., bars per slot, but do not hold for three, five or seven.

There are two essential conditions for the equal division of current in a double-commutator type machine. (1) The total induced voltage between neutral points on each commutator should be exactly the same. On account of the low internal drop, usually found in low-voltage, large-current machines, a small discrepancy between the two generated voltages would amount to a large percentage of the total voltage and would produce a large unbalancing in current between the two commutators.

A difference in voltage on the two commutators may be accounted for, when it is remembered that any winding having an integral number of slots per pole, which has a pitch throw when viewed from the front end, will necessarily have a one-slot chord throw when viewed from its rear end. As machines requiring double commutators are usually wound for low voltage, they must use a very small number of slots per pole. The reduction of voltage, due to chording, increases rapidly as the number of slots per pole is reduced, so that, for this class of machines, a considerable difference of voltage, measured in per cent. of the full-load internal drop, might reasonably be expected between the commutator on the front and that on the rear end.

In support of this statement, it may be pointed out that it has usually been necessary to insert resistance between the two parallel commutators in order to consume this difference of voltage before satisfactory division of load could be obtained. In case resistance was not inserted, an equivalent effect, so far as load division was concerned, but not equivalent commutating conditions, could be produced by shifting the brushes on the commutator having the higher voltage until the voltages across the brushes for both commutators were equal. Shifting the brushes from neutral caused bad commutating conditions with resultant sparking.

(2) The instantaneous location of the commutating zones of each commutator should be identical for best performance. Outside of the fact that both zones do not occupy the same position at all instants, in the usual type winding, not very much of a definite nature can be said on this point, A one-slot chorded winding always has a commutating zone which is one tooth pitch wider than the commutating zone of the pitch winding. The difference, in generated voltage, between the two commutators may be computed from this consideration on the assumption that the coils undergoing commutation do not contribute to the generated voltage.

Figure 6:
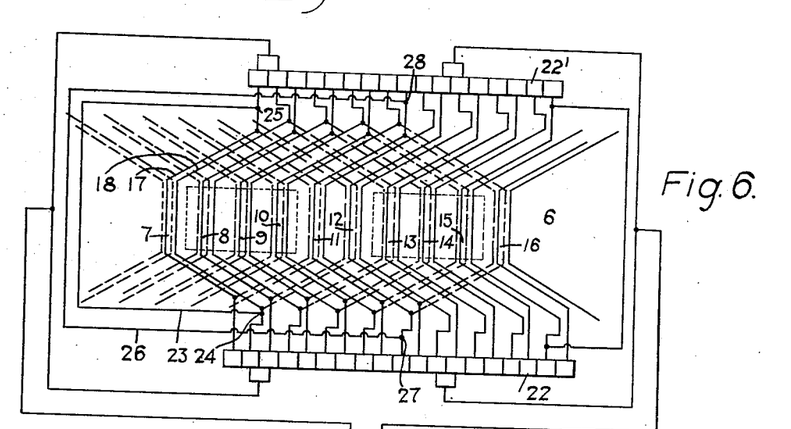
Fig. 6 is a view, similar to Fig. 1, illustrating the application of the winding thereof to a machine of the double-commutator type.

In the double-winding, double-commutator machine of Fig. 6, the essential conditions for parallel operation are satisfactorily fulfilled. The two windings may be connected to both commutators, as shown. As many non-current-carrying, equi-potential connections may be made between the two commutators as there are commutator bars. Thus, for every bar in commutator 22 there is a bar in commutator 22' which is of the same potential and in mechanically the same position with respect to the machine's commutating zone.

Viewing this winding from one end, it may have (for a two-bar-per-slot winding) one coil per slot having a pitch throw and the other coil having a long chord of one slot. Viewed from the other end, there will be one coil per slot with a pitch throw and one coil with a short chord of one slot. The commutating conditions on both commutators are thus identical and the commutating zone is the same width for both windings.

Obviously, each separate winding may connect to one commutator exclusively without introducing any change other than reducing the number of bars in each commutator by 50% and doubling the reactance voltage over the value obtainable with both windings connected to both commutators.

Figure 7:
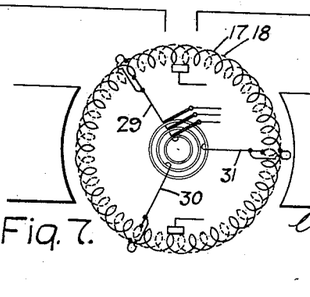
Fig. 7 illustrates my invention diagrammatically as applied to a rotary converter.

My invention is also susceptible of application to rotary converters, as indicated in Fig. 7, wherein two armature windings 17 and 18, having different pitch, as indicated in the other figures, are employed, the leads 29, 30 and 31 from the different slip rings being conducted to points at the front end of the winding 18 and to points of like potential at the back end of the winding 17.

The foregoing discussion has been limited to lap windings but the same principles are obviously equally capable of application to wave windings, as well as to multiple turn per coil and to series-parallel winding combinations of either the lap or wave type.

While I have shown my invention in a plurality of forms, it will be obvious to those skilled in the art that it is susceptible of various minor changes and modifications without departing from the spirit thereof and I desire, therefore, that only such limitations shall be placed thereupon as are imposed by the prior art or as are indicated in the appended claims.

I claim as my invention:

1. In a dynamo-electric machine, the combination with an armature core, of a plurality of distinct windings of different coil-pitch mounted thereon, means for commutating current from said windings, and connections between equi-potential points in said windings.

2. In a dynamo-electric machine, the combination with an armature core, of $n$ distinct distributed windings thereon, the pitch of certain coils in said windings differing from the pitch of other coils in said windings, a commutator cylinder, connections from one of said windings to $\frac{1}{n}$th of the segments of said commutator cylinder, said segments being evenly spaced therearound, similar connections from each of the remaining windings to a similar portion of the commutator segments, and connections between equi-potential points in said windings.

3. In a dynamo-electric machine, the combination with an armature core provided with a plurality of winding slots, of a plurality of distinct windings mounted thereupon, each of said windings traversing each of said slots and one of said windings having a different coil pitch from another, a commutator cylinder, connections from successive coils of said windings to the segments of said commutator cylinder in the order in which the center lines of the respective coils are located around said core, and connections between equi-potential points of the different windings.

4. In a dynamo-electric machine, the combination with an armature core, of a plurality of multi-coil windings disposed thereupon, the coils of one winding being located in off-set relation to the coils of another winding and having a different pitch therefrom, whereby the phases of the electromotive forces generated in the respective coils of the two windings are interspersed with each other, a commutator cylinder, connections from the respective coils of the different windings to segments of said commutator cylinder in the order of the phases of the electromotive forces in the different winding coils, and connections between equi-potential points in the different windings.

5. In a dynamo-electric machine, the combination with an armature core, of two distinct lap windings disposed thereupon, one of said windings being composed of pitch-wound coils and the other of said windings being chorded in the direction of progression thereof, connections between equi-potential points in said two windings and means for commutating current derived therefrom.

6. In a dynamo-electric machine, the combination with an armature core provided with winding slots, of two distinct windings disposed in said slots, one of said windings being composed of pitch-wound coils and the other of said windings being chorded the slot pitch in the direction of progression of said winding, connections between equi-potential points in said two windings, a commutator cylinder for said armature, connections from spaced points in one of said windings to alternate segments in said cylinder and connections from similarly spaced points in the other winding to the remaining segment, said points being so chosen that the potential of each commutator segment is, at all times, intermediate between the potentials of the immediately adjacent segments.

7. In a dynamo-electric machine, the combination with an armature core provided with winding slots, of two distinct windings disposed in said slots, each slot containing more than one conductor of at least one of said windings, all of the winding coils but one which have one side lying in a certain slot having a polar pitch and said remaining coil being chorded the slot pitch in the direction of progression of the related winding, connections between equi-potential points in the two windings, a commutator cylinder for said armature, connections from spaced points in one of said windings to alternate segments in said cylinder and connections from similarly spaced points in the other winding to the remaining segment, said points being so chosen that the potential of each commutator segment is, at all times, intermediate between the potentials of the immediately adjacent segments.

8. In a dynamo-electric machine of the commutator type, a slotted armature core, two parallel windings carried in the slots thereof, each winding being connected to alternate commutator-segments and said windings having coil widths differing from each other by the distance between adjacent slots, and connections between equi-potential points in the two windings.

9. In a dynamo-electric machine, a slotted armature-core provided with a commutator, two armature-windings carried in said slots thereof and differing from each other in the slot-pitch of their coils, connections from said windings to alternate commutator-segments, and connections between equi-potential points in the two windings.

10. In a dynamo-electric machine, a slotted armature core provided with a commutator, two windings carried in the same slots but having an effective relative phase displacement equal to one-half the distance between adjacent slots, connections from said windings to alternate commutator-segments, and connections between equi-potential points in the two windings.

11. In a dynamo-electric machine, a slotted armature-core provided with a commutator, two windings carried in the same slots and differing from each other in the slot-pitch of their coils, connections from said windings to alternate commutator-segments, each coil of each winding having one side in the top and the other in the bottom of a slot and being arranged with its median line midway between the median lines of the two coils of the other winding which are connected to the segments on each side of the segment to which it is connected, and connections between equi-potential points in the two windings.

12. An alternating-current motor, comprising a slotted armature-core provided with a commutator, two parallel windings carried in the slots, each winding being connected to alternate commutator-segments and said windings having coil widths differing from each other by the distance between adjacent slots, and connections between equi-potential points in the two windings.

13. In a dynamo-electric machine of the "multiple" or "lap" type, a slotted armature-core provided with a commutator, two windings carried in the same slots but having an effective relative phase displacement equal to one-half the distance between adjacent slots, each coil of each winding having one side in the top and the other in the bottom of a slot and connections from said windings to alternate commutator-segments, and connections between equi-potential points in the two windings.

14. An alternating-current motor, comprising a slotted armature-core provided with a commutator, two windings carried in the same slots but having a relative displacement equal to one-half the distance between adjacent slots, connections from said windings to alternate commutator-segments, brushes bearing on said commutator and having a sufficient width to bridge adjacent segments connected to the same winding, and connections between equi-potential points in the two windings.

In testimony whereof, I have hereunto subscribed my name this 7th day of Sept., 1916.

FLOYD T. HAGUE.